NO PRINTED SPECIFICATION AVAILABLE
1726X
P. Geiger.
Paint Mill.
Patented May 12, 1812.
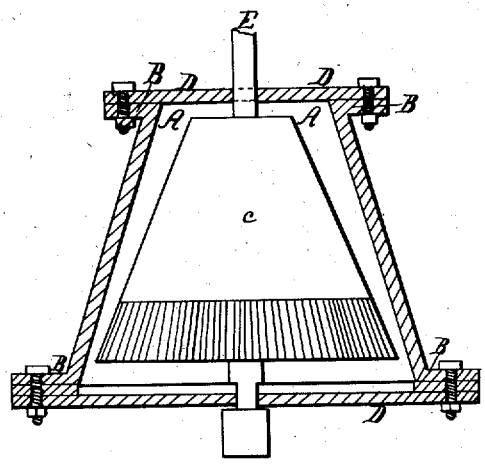
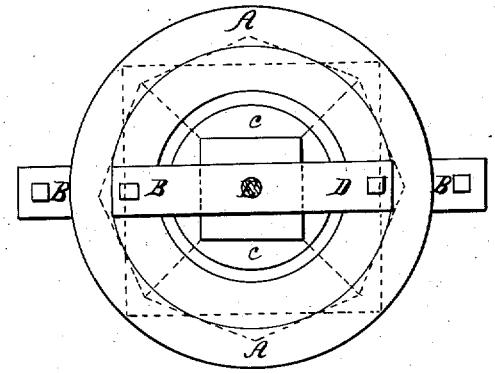

May 12, 1812

Paul Geiger 1726X

Letters Patent

The Schedule referred to in these Letters Patent and making part of the same containing a description in the Words of the said Paul Geiger himself of his — Machine for breaking [illegible] of Ores or other hard Substances.

A hopper of cast iron in the form of a frustum of a cone, with four ears cast to it two projecting from the top and the other two from the base diametrically opposite each other. A cast iron nut of a Pyramidical or an octagonal at the base decreasing its diameter regularly to about one fourth of its length. when it begins to change its form from an octagonal into a quadrangular shape tapering regularly to the top. the octagonal sides are furrowed out into teeth or catches perpendicular on one side and oblique on the other. which gives each furrow a sharp edge. the nut is worked in a retrograde motion, by which motion the intervening substance is with an increasing pressure broken against the side of the hopper until small enough to fall through between it and the nut. which works the two bridges or stays at the top and bottom of the hopper. two bridges or stays of wrought iron which are bent across the top and bottom of the hopper to the extremities of the ears to which they are fastened by screws. the lower bridge or stay on which the nut turns is separated from the hopper by plates of iron fastened of a sufficient thickness so as to afford a passage all round the hopper for the broken substance to fall away. the shank of the nut passes through the lower bridge or stay in which it turns and is squared at the end to which the power that turns it is applied.

Witnesses
Jn [illegible]
John E. Roberts

Paul Geiger

Ex[illegible]
[illegible]

(312 words)